Sept. 3, 1935.  H. L. BLYDENBURGH  2,013,597
LAWN MOWER
Filed Nov. 15, 1933  4 Sheets-Sheet 3
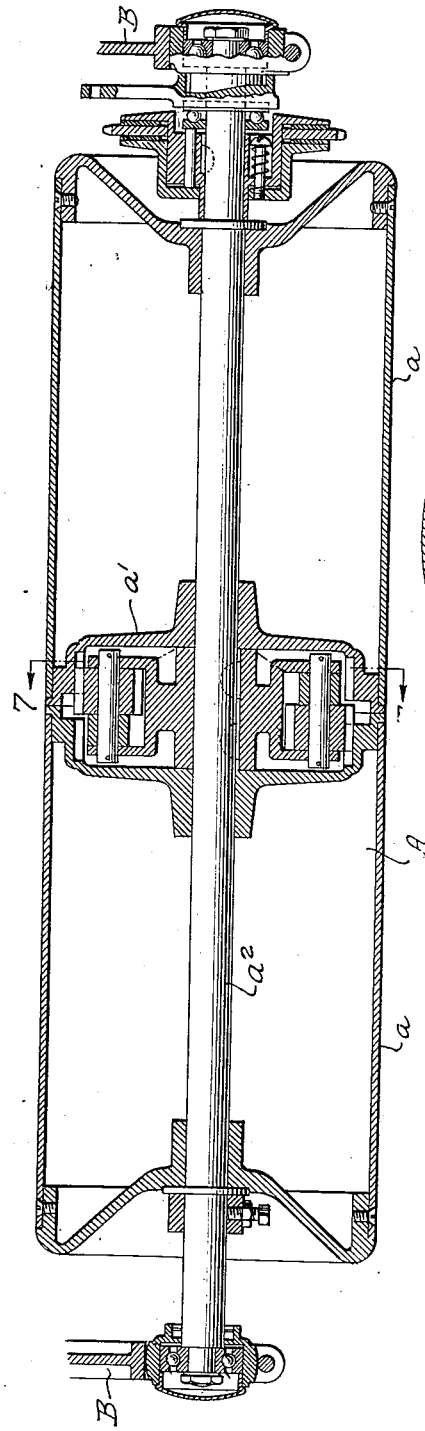
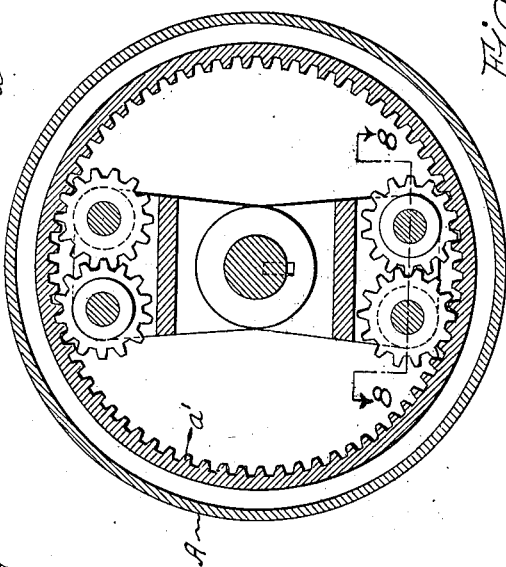
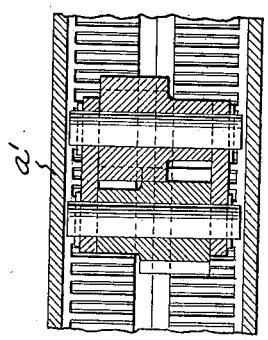
INVENTOR
Harold L. Blydenburgh,
BY
ATTORNEYS

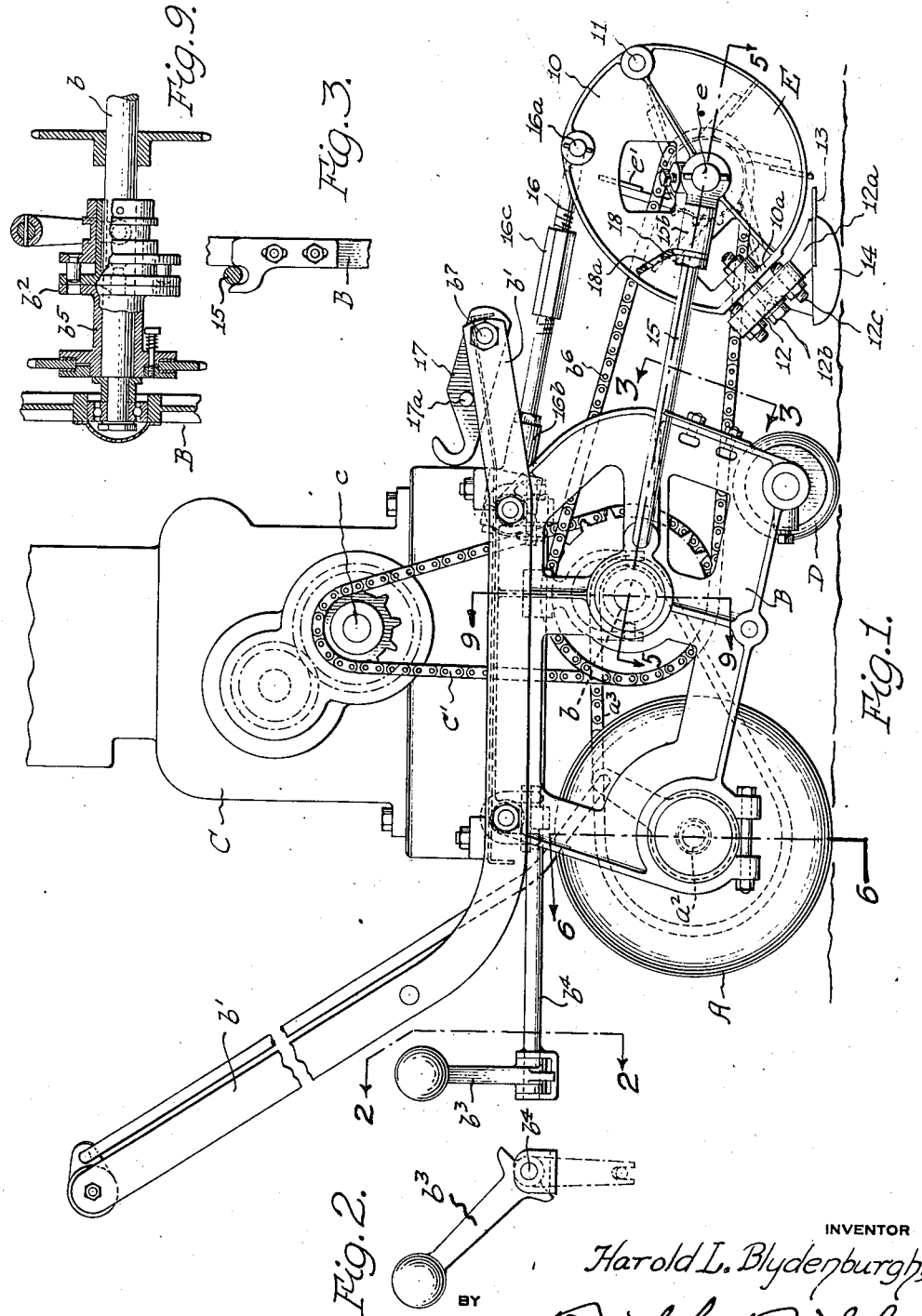

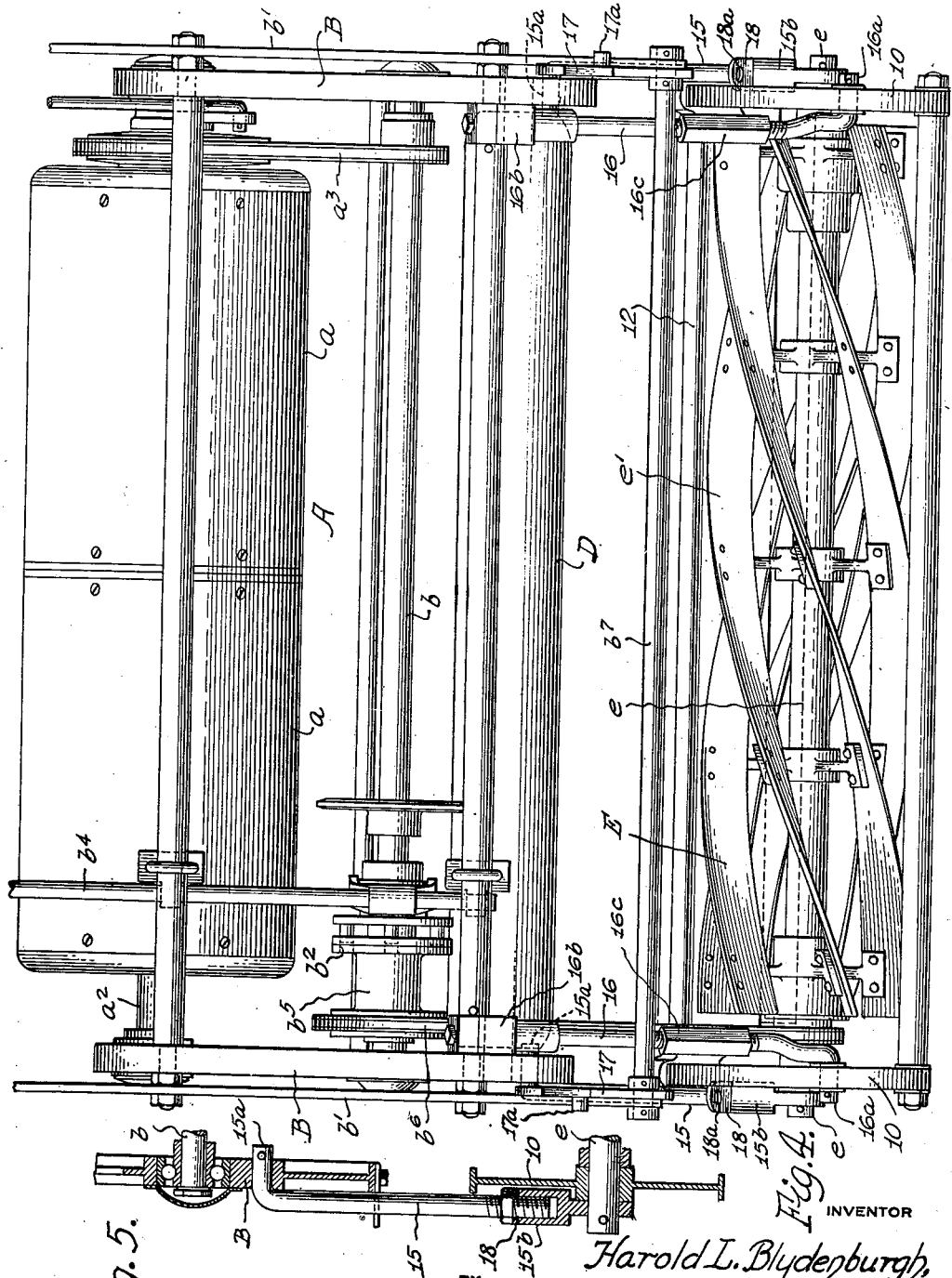

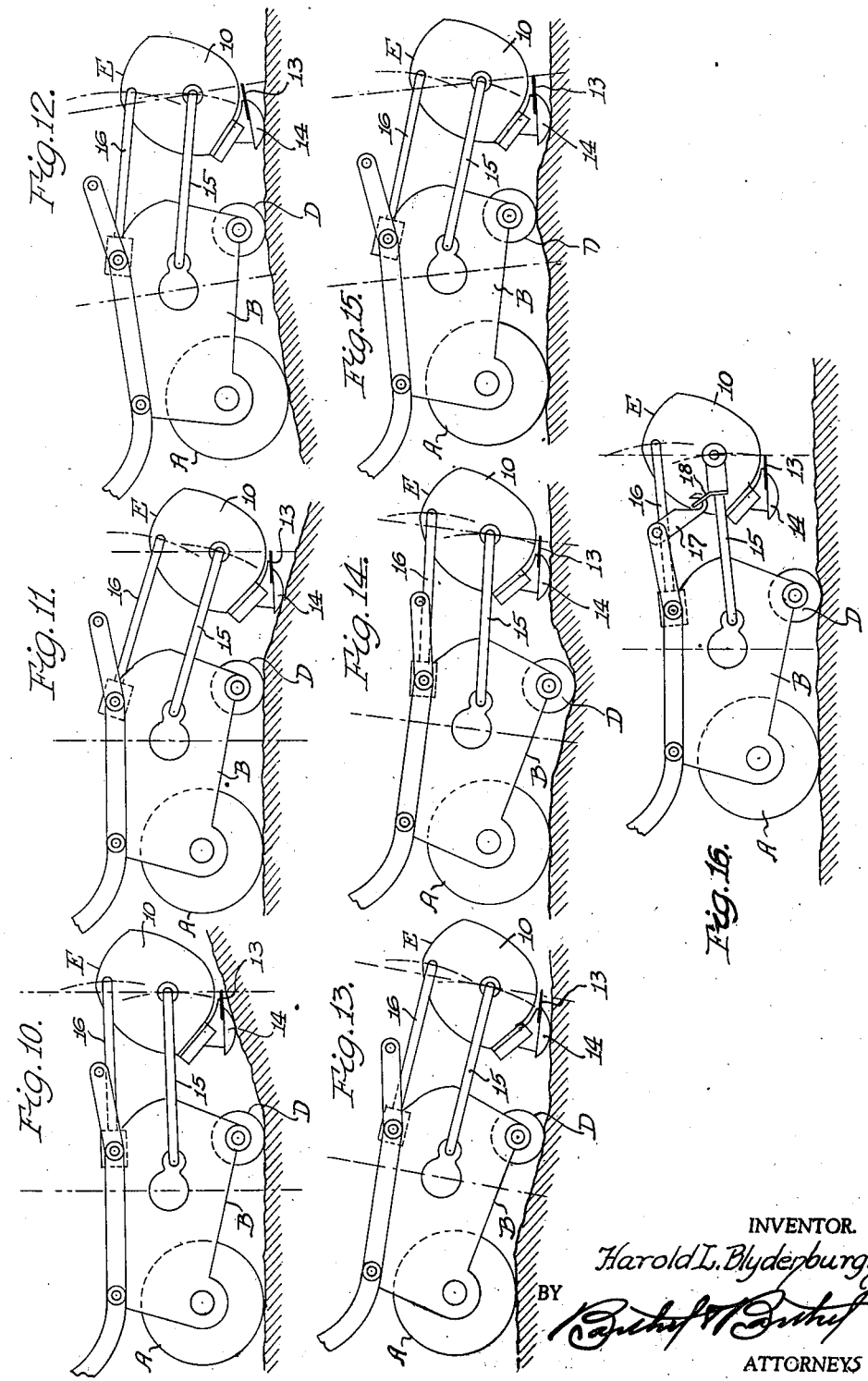

Patented Sept. 3, 1935

2,013,597

UNITED STATES PATENT OFFICE 2,013,597

LAWN MOWER

Harold L. Blydenburgh, Detroit, Mich., assignor to The Moto-Mower Co., Detroit, Mich., a corporation of Michigan Application November 15, 1933, Serial No. 698,160

20 Claims. (Cl. 56—26)

This invention relates to improvements in lawn mowers, pertaining more particularly to machines of this type driven by power.

Lawn mowers operated through ground wheel drive, are generally of comparatively narrow width of cut and readily manipulated in service. The desirability of being able to cut a comparatively wide zone has led the development of the art in the direction of utilizing motive power as a drive power source, a suitable internal combustion motor mounted on the frame of the mower being usually employed, the ground wheels and the cutting reel or reels being driven thereby through suitable drive connections. Because of the weight of the power unit, the overall dimensions of the frame are fairly large, and hence the addition of the cutting unit to such main supporting frame provides a dimensional characteristic such as to make it advantageous to mount the cutting unit movable bodily relative to the frame to permit sufficient flexibility between the power and cutting units as to enable the latter operating properly with respect to the grass to be cut without being materially affected by the power unit rolls when travelling over undulating surfaces. It is to this particular type of mowers that the present invention pertains.

As will be understood, such flexibility can be obtained by connecting the power unit frame and cutting reel frame by a simple link—which might be a shaft of the drive connections of the cutting reel, the arrangement being such that the reel can move in a vertical arc as well as about the cutter reel axis, but such arrangement practically requires the presence of a three or four point support for the cutting unit, to prevent the latter from moving out of position to provide the proper cut; where such forms are used, two of the supports are generally in the form of castor wheels, located at the front, the rear support being a shoe or a pair of shoes properly positioned. Since the castor wheels are in front of the line of cut, they must travel over the uncut grass and thus have a tendency to turn down the grass and affect the clean cutting. The same condition is present if the wheels and shoes are reversed in position, or shoes alone be employed, the feature in this respect being that supports must be placed in advance of the line of cut as well as in rear, since the presence of the support at front or rear alone would permit the frame to rotate on its axis and thus affect the position of the cutting knife.

It is therefore desirable to limit the cutting unit support to a position in rear of the line of cut, but this necessitates the use of some means for preventing rotation of the cutting unit frame on its axis. Various expedients have been proposed, generally in the form of linkage structures, these, in some cases, providing for movements designed to utilize the ground undulations as the basis for the frame movements; in other cases, the linkage is arranged to permit adjustability in the height of the cutting knife, so as to regulate the depth of cut, etc. Generally, these linkage structures are more or less complicated and of such arrangement as to make it more or less difficult to obtain adjustments, etc.

The present invention is designed to limit the cutting unit support to a position in rear of the line of cut, and retain the cutting frame against free rotation on its axis, by the use of linkage which presents characteristics of a parallelogram, the connecting links forming the sides of the figure with the power unit and cutting unit frames providing the ends of the figure, each link having a pivotal connection at both ends. As a result, the position of the cutting knife remains practically constant relative to the unit axis during the swing of the unit, although the swing itself is on two individual arcs which intersect. By permitting adjustability in the length of one of the links, the frame can be swung on its axis to change the angularity of the cutting knife and thus regulate the depth of the cut. The parallelogram is arranged angular to a horizontal plane, and through the link length and such angularity, the cutting edge remains practically constant as to depth when travelling over undulating surfaces.

The linkage also permits ready positioning of the cutting unit in an inoperative position to permit the ready transportation of the mower, suitable holding structures being provided for the purpose.

The mower includes a number of other features specifically referred to hereinafter and which form objects of the present invention.

To these and other ends, the nature of which will be more clearly understood as the invention is hereinafter disclosed, said invention consists in the improved construction and combinations of parts hereinafter fully described, illustrated in the accompanying drawings, and more particularly pointed out in the appended claims.

In the accompanying drawings, in which similar reference characters indicate similar parts in each of the views, Figure 1 is a side elevation of a lawn mower disclosing the present invention;

Fig. 2 is a detail view taken on line 2—2 of Figure 1;

Fig. 3 is a fragmentary view taken on line 3—3 of Figure 1;

Fig. 4 is a plan view, parts being omitted for the purpose of clearness;

Fig. 5 is a detail sectional view taken on line 5—5 of Figure 1;

Fig. 6 is a sectional view taken on line 6—6 of Figure 1;

Fig. 7 is a detail sectional view taken on line 7—7 of Figure 6;

Fig. 8 is a detail sectional view taken on line 8—8 of Figure 7; and

Fig. 9 is a detail sectional view taken on line 9—9 of Figure 1.

Figs. 10 to 15, inclusive, are a series of views, diagrammatic in form, and which present portions of the mower in general side elevation, presenting various relationships of the several units in service and under varying ground surface conditions.

Fig. 16 is a view of similar type but showing the cutting unit in its raised position.

For the purpose of illustrating the present invention, the same has been shown in connection with structures which form parts of a well-known power lawn mower, shown more or less in detail, the description of which, however, is presented in general form, the disclosure being designed as more or less illustrative of structures generally of this type.

The power unit includes a ground roller formation A divided into two parts $a$ $a$ these being connected by a suitable differential structure $a'$ (Figs. 6, 7 and 8), these being mounted on a shaft $a2$ mounted on a frame B which constitutes the power unit frame, and on which is mounted a suitable motor C, shown as of the internal combustion engine type, and which includes a drive shaft $c$. The frame B carries a counter-shaft $b$, driven from shaft $c$ by a suitable drive connection, shown as a chain drive $c'$, shafts $b$ and $a2$ having a similar chain drive connection $a3$. The frame B also carries a forward roller D, rollers A and D forming the travelling support for the power unit. The usual control structures for controlling motor operation and activity and inactivity of the roller A are not referred to in detail, since they are usual with mowers of this type. The frame has the usual rearwardly-extending steering structure $b'$.

The shaft $b$ also forms the drive for the cutting unit, the shaft having a clutch structure $b2$, controlled through the manipulation of a handle $b3$ mounted on rod $b4$, the clutch being adapted to engage and disengage a sleeve $b5$ mounted on shaft $b$ and which carries the drive sprocket for the chain drive $b6$ which leads to the sprocket carried by the shaft $e$ of the cutting reel $e'$ which form parts of the cutting unit E, shaft $e$ being mounted in side members 10 of a frame of this unit, the latter being completed by a cross-rod 11, and a cross-bar 12, located respectively to the front and rear of a vertical plane extending through the axis of shaft $e$. The cross-bar 12 carries the stationary cutting member 13, as well as a shoe or shoes 14, depending on whether it is desired to have the shoe extend the full width of the cut or be in the form of a pair of shoes in the end zones of the cut. The cross-bar 12 is supported by the members 10 adjustably, an arm 12a at the ends of the bar being opposite a portion 10a of the periphery of a member 10, the arm and member being connected by a bolt or screw 12b, with the arm carrying adjusting members 12c adapted to contact with said member portion, thus permitting adjustment of the arm toward and from the member, each end of the cross-bar being similarly equipped. This permits the knife to be adjusted relative to the travel path of the reel cutting edges.

The cutting unit is located in advance of the power unit, and is designed to be swingable relative thereto. This result is obtained by connecting the cutting unit to the frame B at each end of the cutting unit, the connections at each end being in the form of two links 15 and 16, the forward end of link 15 being pivotally mounted on shaft $e$, while link 16 has its forward end connected to the side member 10 above the path of travel of the cutting reel. The rear end of link 15 is connected to frame B in advance of but adjacent to shaft $b$.

As shown in Fig. 1, the shoe 14 and the rollers A and D are located in an approximately horizontal plane representing the surface of the lawn. The dimensions of the cutting unit are such that in such position the cutting knife 13 and cutting reel are in approximately the desired locations. This places the shaft $e$ on a lower plane horizontally than the plane of shaft $b$, and in locating the position of the rear end of link 15, this relationship of the two shafts is considered, with such link rear end positioned practically on a line connecting the two shafts when in this position.

This arrangement is of advantage through the fact that in swinging the cutting unit, as presently explained, the radius of such movement will be less than the distance between shafts $b$ and $e$ in the position above indicated, so that the chain connection $b6$ will not be tightened by the swinging action; in other words, with the rear end of link 15 on a line connecting the axes of shafts $b$ and $e$ in this particular position shown, the link itself will extend on such line and thus locates the shaft $e$ at its greatest distance from shaft $b$. With the link of shorter length than the distance between the shafts in this position, the swinging arc traversed by shaft $e$ will be on a radius less than that of the distance between the shafts with the result that in swinging from this position the distance between the shafts will tend to decrease, although the decrease is slight—the difference between arcs based on the axis of the rear end of link 15 and of shaft $b$. Since shafts $b$ and $e$ carry the sprockets for the chain connection $b6$, it can be understood that the chain adjustment for the position shown will ensure and permit free chain drive action during any swinging movement of the cutting unit; due to the fact that the arcs referred to are almost co-incident, the variation is very slight within the range of the normal swinging movement, so that there is no material effect on the drive action, any effect being in the direction of slackening the chain rather than tightening it as compared with the position shown.

As indicated, link 15 extends on a line connecting the axes of the two shafts $b$ and $e$ in the position shown, thus placing the link as inclined to the horizontal. This particular inclination is also provided with respect to link 16, the two links being in substantial parallelism. To complete the characteristics of a parallelogram, the positions of the front and rear end connections of link 16 are arranged at substantial right angles to the angle of link 15 to the horizontal in the position shown. In other words, in the position shown, the location of the front end of link 16 above the axis of shaft e is on a line extending at right angles to the line of link 15 and extending through the axis of shaft e. Similarly, in such position, the location of the rear end of line 16 is on a line parallel to the line of the front ends of the links and extending through the axis of the rear end of link 15.

As a result, the cutting unit is definitely positioned relative to the power unit, so that the shaft e will have a definite swinging path, and at the same time the side members 10 will be held against rotation about shaft e excepting as determined by the action of link 16, the shaft swinging on the axis of the rear end of link 15 while the rotation of the side members 10 will be determined by the swinging of the front ends of links 16 on the axis of the rear end of such link 16. In other words, the front end of each link will traverse an arc individual to itself, but because of the angularity of the links in the position shown and the effect of the parallelogram characteristics, the line which connects the axes of the front ends of the links retains substantially the same angularity during the swinging movements, the position of the front end of link 16 being such that the small rotation of the members 10 will be due to the shifting of the axis of the front end of link 16 on an arc which closely approaches the horizontal during actual service conditions.

Thus far, the description of the swinging movement of the cutting unit has been based on the assumption that the mower is stationary, so that the rollers A and D preserve the substantially horizontal characteristic of the power plant shown in the drawings; the swinging movements of the cutting unit being considered on the basis of no change in the position of the rear ends of links or struts 15 and 16, the swinging action being restricted to the forward ends of these struts. Under these conditions, there is necessarily a slight change from the exact parallelism of the sides and ends of the parallelogram, during swinging movements, due to the fact that the rear end of the parallelogram remains constant while the links change their angles to the horizontal, so that the included angle at the rear end of a strut changes in value to an extent determined by the extent of swing. The parallelism between the struts may vary to a slight degree during such movement, since the distance between two horizontal planes extending through the axes of pivotal movement of the front ends of the struts may vary while the distance between the planes at the rear ends remains constant, the variation at the front end being due to the fact that the axis of the front end of strut or link 16 travels in an arcuate path the center of which is the axis of the front end of strut or link 15.

In other words, the arrangement does not provide the complete characteristics of a structure of the "parallel ruler" type, since, in the position shown, only the connection at one end is shifted, so that parallelism of the links is not necessarily preserved during the shifting movements, but the variation is of no material amount within reasonable limits of shifting movement due to the fact that the axis of the front end of strut 16 is in the top zone of the frame 10 so that the distance change between the horizontal planes is changed but slightly as such axis swings about the axis of shaft e.

However, there is a variation from this under actual service conditions. As will be understood, the mower travels as a complete assembly, so that where the ground surface is not perfectly flat, or of the undulatory characteristic, the three contacts—shoe 14, roller D and roller A approach the point of change in the ground condition in that order. For instance, if the change is to an upward slope, the shoe 14 first reaches the point of change and causes the contact unit to swing upwardly along the lines indicated above, the swinging range increasing as the shoe traverses the slope, the limit in this respect being reached when roller D reaches the bottom of the slope. As roller D raises in traversing the slope, the shoe and roller D would have their points of ground contact on the equivalent of the level surface—the surface of the slope—but this fact does not immediately restore the former condition, due to the fact that while the roller D has been raised by the slope, roller A still remains on the level ground. And this fact varies the operation due to the fact that the variation in position of roller D necessarily swings the frame of the power plant around the axis of roller A, this swinging continuing until roller A advances to the position where its point of ground contact is at the base of the slope. As roller A also begins to traverse the slope, the three contact points then resume the conditions shown in Fig. 1, excepting that the ground line then represents the slope.

When the crest of the slope is reached, the shoe 14 first detects the change and again begins a cycle of development such as pointed out, the extent of the swinging movements of the parts depending on whether the crest leads to a level surface, or a downward slope, or even a simple reduction or increase in the angularity of the upward slope. In other words, the cycle of development of the various swinging activities produced by a change in the ground contour is present in connection with both units, due to the fact that the shoe 14 and roller D are movable relatively to each other and can control the shifting movements of the cutting unit, while rollers A and D perform a similar function with respect to the power unit.

The effect of this development can be readily understood. Since the rear axes of the two links 15 and 16 are fixed in position with respect to the power unit frame, it can be understood that swinging movement of the latter frame about the axis of roller A necessarily changes the positions of these axes relative to a vertical plane. Both axes are normally above a horizontal plane through the axis of roller A, so that swinging of the power unit frame carries the strut axes in the same direction relative to such vertical plane, but with the distance changes varying due to the vertical spacing of the strut axes, the variation depending, of course, on the length of the radii of the swinging action; if the strut axes were positioned at equal radial distance from the axis of roller A, the variation would be considerable due to the fact that the axis of strut 15 is adjacent the horizontal plane through the axis of roller A, while the axis of strut 16 (reference being made to the axes of the rear ends of these struts) is more remote from such plane, so that the arcs traversed have different relations to a vertical plane.

However, as indicated in Fig. 1, the radius of the end of strut 16 is greater than that of strut 15 with the result that the arc of travel of the axis of the end of strut 16 is of greater radius and therefore flatter so that the distance change of this axis is not as great as if the length of the radii were equal.

When, therefore, roller D begins to traverse the upward slope, swinging of the power unit frame on the axis of roller A causes the axes of the rear ends of the struts to traverse their respective arcs, both tending to bring the shoe nearer to the roller D, so that the shaft e would be shifted slightly if the swinging movement were large. Since, however, the axis of the front end of strut 16 moves in a circular path relative to shaft e, it can be understood that through the greater rearward movement of the axis of the rear end of the strut 16, the movement of the front end of this strut will be greater and in a direction to tend to rock the cutter unit frame counter-clockwise in Fig. 1 and thus shift the position of the shoe forwardly, so that although the swinging of the power unit frame would seemingly tend to bring the shoe nearer to roller D, the linkage described serves to counteract this condition.

A number of possible ground surface conditions and the effect thereof are shown diagrammatically in Figs. 10 to 15, inclusive. These will indicate various effects produced on the cutting unit as the resultant reaction to the movement of the mower over undulating surfaces.

From this it can be understood that the position of shaft e is not materially changed from a vertical plane during these various automatic adjustments provided by the swinging of the two units, strut 15 approaching the horizontal, so that the shaft is at the flattest zone of the arc of movement when the latter is based on the swinging of the cutter unit bodily. And the same is true with respect to the axis of the rear end of strut 15 and its location but a short distance above a horizontal plane through the axis of roller A; such rear axis is thus in the flattest zone of its arc of travel about the axis of roller A, but sufficiently above the horizontal plane so that roller D may drop a considerable distance before the axis of the rear end of strut 15 would reach the horizontal plane or dead center position.

However, due to the greater distance of displacement of the axis of the rear end of strut 16—assuming the roller D to be moving on an upward slope—from a vertical plane, the rocking of the cutter frame by strut 15 will be affected to a greater extent, thus effecting a change in the position of the shoe, with the result that the conditions of compensation are taken care of to an extent such as to provide for efficient operation, even in presence of a ground surface excessively undulating.

While these movements are produced through the relationships set up between the two units by the linkage, it can be understood that the distance relation between the pivot axes at the opposite ends of a link remains constant in service; the distance between such axes of link or strut 15 is generally uniformly constant, although adjustment can be had to take up for chain wear, etc., but the distance of the axes of link or strut 16 are variable through the turnbuckle action, and so may be varied at will—but remains constant during service. As a result, and due to the fact that the forward axis of link 15 is coincident with the reel axis, strut 15 generally controls the movement of the cutting unit bodily, while strut 16 controls the movement of the cutting blade about the reel axis. But, due to the fact that the relationship of the rear axes of these struts has the particular relationship to the axis of roller A, the entire assemblage sets up a definite compensating action through the effect of the traction of both units over the surface being operated upon.

All of the changes set up by the varied positions which the mower may assume in service are not referred to specifically above, these being readily determined by considering the effects of the changes produced by the illustrations given above. The conditions indicated in the drawings are present when the surface is level, whether that surface correspond with or be inclined to the horizontal, but these conditions change through the development of a general cycle such as referred to above when the surface varies from such level, with the shoe first detecting the change, followed by roller D and finally ending the cycle when roller A reaches the succeeding level. During the cycle period set up by a change in ground characteristics, whether the change be produced in an upward or downward direction, the two units, connected by the substantially rigid links or struts, set up various compensating activities through the combined action of both units, with the compensating effect made manifest at the cutting point. It is possible that the cutting line may vary slightly during the changes, but the variation, if present, is so slight as to be inconsequential, so that the appearance of the mowed ground is not affected by its presence.

As indicated in Fig. 5, link 15 has its rear end bent laterally as at 15a, this bent portion extending through frame B and providing the axis of pivotal movement of the rear end of the link. The forward end of link 15 is threaded into a coupling member 15b carried by shaft e outside of the side member 10, the arrangement presenting the ability for adjustment in the length of the link, thus permitting for take up in chain length conditions.

Link 16 is somewhat similar in arrangement, the bent end 16a, however, extending through the side member 10, with the rear end threaded to a pivoted member 16b carried by the frame B, link 16 being positioned inside of the frame and side member, as indicated in Fig. 4. Link 16, however, distinguishes from link 15 in an important respect, being formed in two parts having the threaded formation which, with a nut 16c will set up the characteristics of a turnbuckle formation to vary the length of the link. The purpose of this turnbuckle structure is to adjust the angularity of the cutting knife 13. For instance, if the length of link 16 is increased, such increase will rotate the side frame 10 clockwise in Fig. 1, and thus relatively raise the cross-bar relative to a horizontal plane through the axis of shaft e but without changing its distance relation to such shaft. Hence, the angle of the cutting knife will be changed and permit a deeper cut to be made. If the length of the link be decreased the rotation will be in reversed direction and decrease the depth of the cut. Such adjustment will change the angularity of the line connecting the front ends of the links—since only the position of the front end of link 16 is being shifted—and thus change slightly the right angular relation of such line to the direction of length of the links, but such change does not materially affect the operation.

The arrangement also permits ready positioning of the cutting unit for transportation. The handle section b' is carried forwardly beyond the front of frame B, with the extensions connected by a cross-rod b7. The latter carries hook members 17, having stops 17a which, with the hook in inactive position, rest on the extensions. The side members 10 carry a bracket 18 having a perforation 18a to receive the hook end. When the cutting unit is swung upwardly, manually or otherwise, the hooks can be swung into engagement with the bracket perforations and thus maintain the cutting unit raised from the ground to permit the power unit to travel without the cutting unit being operative; Fig. 16 shows, diagrammatically, the cutting unit in such raised position; at such time the clutch b2 shown in detail in Fig. 9, is in position to disconnect the drive sleeve b5 from shaft b.

The contact surface of the shoe is curvilinear and of convex characteristics so that when shifting of a side member changes the angularity of the plane of the cutting blade, as when reaching a slope of the mowing path, the shoe permits of the change in height of the line of cut as to compensate although the angularity of the radius remains substantially constant.

While I have herein shown and described a preferred construction and arrangement, it will be readily understood that changes and modifications therein may be found desirable or essential in meeting the exigencies of service conditions or the desires of users, and I desire to be understood as reserving the right to make any and all such changes or modifications as may be found desirable or essential, insofar as the same may fall within the spirit and scope of the accompanying claims, when broadly construed.

Having thus described my invention, what I claim as new is:—

1. In a lawn mower, a power unit, a cutting unit including a rotatable cutting reel and a relatively stationary cutting blade co-operating to provide a cutting line of definite distance from the reel axis on a radius extending from such axis, and connections between said units and each having individual pivotal relationship with both units and operative to retain the distance between pivot axes of a connection and the units constant during service, said connections permitting swinging of the cutting unit bodily in an arcuate path and rotative movement of the cutting blade about the cutting reel axis by the traction of the connected units during service.

2. A mower as in claim 1 characterized in that the cutting blade is adjustable relative to the reel axis to vary the length of such radius.

3. A mower as in claim 1 characterized in that the several connections are each rigid between the pivot axes of a connection and the units.

4. A mower as in claim 1 characterized in that the connections at each side are in pairs with one of the pair connections of fixed length and the other connection of the pair adjustable as to length to vary the distance characteristic of the pivot axes of such adjustable connection at will.

5. A mower as in claim 1 characterized in that the cutting unit includes side members rotative on and relative to the reel axis, a holder for the cutting blade secured to said members with the holder fixedly positioning the blade in definite plane relation to the holder, said connections being operative to provide rotative movement to the side members and thereby vary the plane of the blade relative to the horizontal during movements of the reel axis in its arcuate path.

6. A mower as in claim 1 characterized in that the cutting unit includes side members rotative on and relative to the reel axis, a holder for the cutting blade secured to said members with the holder fixedly positioning the blade in definite plane relation to the holder, said holder also including a shoe formation adapted to contact the surface traversed by the mower, with the shoe formation having a curvilinear contact surface of the convex type, said connections being operative to provide rotative movement to the side members during movements of the reel axis in its arcuate path to thereby vary the plane of the blade relative to the horizontal and through the curved contact surface of the shoe formation permit the line of cut to be maintained substantially constant as to depth of cut during such reel axis movement.

7. A mower as in claim 1 characterized in that the power and cutting units carry complemental manually-operated means co-operative to support the cutting unit in inactive position when the cutting unit has been swung upwardly in its arcuate path a definite distance.

8. A mower as in claim 1 characterized in that the power unit carries a pair of pivoted hooks, and the cutting unit includes side members each carrying a member co-operative with one such hook to support the cutting member in inactive position, the hooks and members being positioned to be brought into co-operative relation when the cutting unit has been swung upwardly in its arcuate path to a definite inactive position.

9. In a lawn mower, a power unit; a cutting unit including a rotatable cutting reel, a relatively stationary cutting blade, and side members for supporting the reel and blade with the members rotative on and relatively to the reel axis; and connections between the power and cutting units and each having individual pivotal relationship with both units and operative to retain the distance between the pivot axes of a connection and the units constant during service, to permit bodily swinging movement of the cutting unit in an arcuate path, said connections including a link connecting the reel axis with the power unit and a second link connecting a side member with the power unit, the point of connection of the latter link with its member being above and spaced from the reel axis.

10. A mower as in claim 9 characterized in that the pair of links extend in substantial parallelism.

11. A mower as in claim 9 characterized in that the point of connection of the second link with its member is forward of a vertical plane corresponding to and extending through the reel axis when the cutting unit is in mowing position.

12. A mower as in claim 9 characterized in that the pair of links and their points of connection with the units substantially present characteristics of a parallelogram.

13. A mower as in claim 9 characterized in that the second link is adjustable as to length.

14. A mower as in claim 9 characterized in that the pair of links extend in substantial parallelism with the first link of substantially constant length and the second link adjustable in length.

15. In a lawn mower, a power unit including a frame carrying a drive shaft; a cutting unit including a cutting reel and its shaft, a relatively stationary cutting blade, and side members rotative on and relatively to the reel axis; drive connections between the drive shaft and reel shaft; and connections between the power and cutting units and each having individual pivotal relationship with both units to retain the distance between the pivot axes of a connection and the units constant during service to permit bodily swinging of the cutting unit in an arcuate path, said connections including a link connecting the reel shaft with the power unit frame, the point of connection with the frame being adjacent to the drive shaft but intermediate said drive and reel shafts, whereby the link is of less length than the distance between said shafts, and a second link connecting a side member with the power unit frame, the point of connection of the second link and its side member being above and spaced from the reel axis.

16. A mower as in claim 15 characterized in that the links extend in substantial parallelism.

17. A mower as in claim 15 characterized in that the links extend in substantial parallelism and inclined forwardly to the horizontal when the power and cutting units are traversing a horizontal mowing path.

18. A mower as in claim 15 characterized in that the second link is adjustable in length.

19. A mower as in claim 15 characterized in that the second link includes a turnbuckle formation to permit adjustment of the length of the link.

20. A mower as in claim 15 characterized in that the links extend angular to the horizontal when the power and cutting units are traversing a horizontal mowing path, the points of connection of the links with the respective units being such as to cause the links and the parts to which they are secured to substantially present characteristics of a parallelogram.

HAROLD L. BLYDENBURGH.